(12) United States Patent
Takeshita et al.

(10) Patent No.: US 12,081,406 B2
(45) Date of Patent: Sep. 3, 2024

(54) BAND ESTIMATION DEVICE, BAND ESTIMATION METHOD, AND PROGRAM

(71) Applicant: NIPPON TELEGRAPH AND TELEPHONE CORPORATION, Tokyo (JP)

(72) Inventors: Erina Takeshita, Musashino (JP); Masanori Yamada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/027,310

(22) PCT Filed: Sep. 28, 2020

(86) PCT No.: PCT/JP2020/036553
§ 371 (c)(1),
(2) Date: Mar. 20, 2023

(87) PCT Pub. No.: WO2022/064675
PCT Pub. Date: Mar. 31, 2022

(65) Prior Publication Data
US 2023/0336425 A1     Oct. 19, 2023

(51) Int. Cl.
*H04L 41/0896* (2022.01)
*H04L 41/0895* (2022.01)
(Continued)

(52) U.S. Cl.
CPC ...... *H04L 41/0896* (2013.01); *H04L 41/0895* (2022.05); *H04L 43/0876* (2013.01);
(Continued)

(58) Field of Classification Search
CPC . H04L 12/4641; H04L 65/80; H04L 65/1069; H04L 47/20; H04L 47/115
See application file for complete search history.

(56) References Cited

U.S. PATENT DOCUMENTS

2008/0247402 A1* 10/2008 Sasaki ................ H04L 47/20
370/401
2009/0316600 A1* 12/2009 Yumoto ............. H04L 12/4641
370/254
(Continued)

FOREIGN PATENT DOCUMENTS

JP        2009118274 A       5/2009

*Primary Examiner* — Barbara B Anyan
(74) *Attorney, Agent, or Firm* — Harness, Dickey & Pierce, P.L.C.

(57) ABSTRACT

An object of the present invention is to provide a band estimation device, a band estimation method, and a program capable of calculating a necessary band of a link of a communication system with high accuracy, and ensure the communication quality and improve the band utilization efficiency.
In the present invention, a machine learning model is created by learning a set of an upper limit value (line information) of a communication band of each line and observed traffic data for a communication system in which a plurality of lines is accommodated in a link between communication devices, a probability density function of a traffic amount at each time is estimated on the basis of the generated machine learning model and the line information at each time, and an upper limit value of a confidence interval of the estimated probability density function is set as a necessary band.

6 Claims, 12 Drawing Sheets

(51) Int. Cl.
*H04L 43/0876* (2022.01)
*H04L 47/11* (2022.01)
*H04L 47/20* (2022.01)
*H04L 65/1069* (2022.01)
*H04L 65/80* (2022.01)

(52) U.S. Cl.
CPC ............ *H04L 47/115* (2013.01); *H04L 47/20* (2013.01); *H04L 65/1069* (2013.01); *H04L 65/80* (2013.01)

(56) References Cited

U.S. PATENT DOCUMENTS

| | | | |
|---|---|---|---|
| 2015/0334030 A1* | 11/2015 | Vasseur | H04L 47/115 370/252 |
| 2016/0182329 A1* | 6/2016 | Armolavicius | H04L 41/0895 370/230 |
| 2016/0277467 A1* | 9/2016 | Rödbro | H04L 65/1069 |
| 2016/0277468 A1* | 9/2016 | Rödbro | H04L 65/80 |
| 2023/0336406 A1* | 10/2023 | Iwaki | H04L 12/4641 |

* cited by examiner

Fig. 3

| TIME | TRAFFIC AMOUNT $y_t$ | CONTRACTED BAND OF LINE 1 $x_t$ 100M | CONTRACTED BAND OF LINE 2 200M | CONTRACTED BAND OF LINE 3 500M | |
|---|---|---|---|---|---|
| t0 | | | | | |
| ⋮ | | DATA USED TO CREATE MODEL | | | |
| t1-1 | | | | | |
| t1 | | | | | |
| ⋮ | | | DATA USED FOR ESTIMATION | | |
| t2 | | | | | |

{y} {x}

[3]

OBSERVATION PERIOD $T_y$
DESIGN PERIOD $T_x$

[9] FORMULA (A)

$$\begin{aligned}
\log p(y|x) &= \left( \int q_\phi(z|x) dz \right) \log p(y|x) \\
&= \int q_\phi(z|x) \log p(y|x) dz \\
&= \int q_\phi(z|x) \log \frac{p(y,z,x)}{p(z,x,y)} \frac{p(z,x,y)}{p(x)} dz \\
&= \int q_\phi(z|x) \log \frac{p(z,y|x)}{p(z|y,x)} \frac{q_\phi(z|x)}{q_\phi(z|x)} dz \\
&= \int q_\phi(z|x) \log \frac{p(y,z|x)}{q_\phi(z|x)} dz + D_{KL}(q_\phi(z|x) \| p(z|y,x)) \\
&= \int q_\phi(z|x) \log \left( \frac{p(y|z,x) p(z|x)}{q_\phi(z|x)} \right) dz + D_{KL}(q_\phi(z|x) \| p(z|y,x)) \\
&= \int q_\phi(z|x) \log p(y|z,x) dz - D_{KL}(q_\phi(z|x) \| p(z|x)) + D_{KL}(q_\phi(z|x) \| p(z|x,y)) \\
&\geq E_{z \sim q_\phi(z|x)} \log p_\theta(y|z,x) - D_{KL}(q_\phi(z|x) \| p(z|x))
\end{aligned}$$

BAND ESTIMATION DEVICE, BAND ESTIMATION METHOD, AND PROGRAM

CROSS-REFERENCE TO RELATED APPLICATIONS

This application is a 371 U.S. National Phase of International Application No. PCT/JP2020/036553, filed on Sep. 28, 2020. The entire disclosure of the above application is incorporated herein by reference.

TECHNICAL FIELD

The present disclosure relates to a technique for calculating a communication band required when a plurality of lines is accommodated in one communication link.

BACKGROUND ART

FIGS. 1 and 2 are diagrams for describing a communication band calculation device 300 described in Patent Literature 1. A communication system 10 connects two communication devices (11, 12) by a link 15. The link 15 accommodates a plurality of lines. An upper limit value (hereinafter described as "contracted band") of a communication band of each line is set according to the contract of each line. The communication devices (11, 12) observe the traffic amount of all lines accommodated in the link 15 at their physical port (11a, 12a), and notify the communication band calculation device 300 of the traffic amount.

The number and contracted band of the accommodated lines change temporally along with new addition, contract change, or deletion of lines, and may change a plurality of times within an observation period Tv and a design period Tx illustrated in FIG. 2 as well. In order to ensure the communication quality of each line (so that traffic is not discarded), a necessary physical band (hereinafter described as "necessary band") is designed (hereinafter described as "band design") for the link 15.

CITATION LIST

Patent Literature

Patent Literature 1: JP 2009-118274 A

SUMMARY OF INVENTION

Technical Problem

Here, the communication system 10 as illustrated in FIG. 1 has the following problems regarding band utilization efficiency.

Assuming that the necessary band of the link 15 is the total sum of the contracted bands of all the accommodated lines, when the utilization rates of a large number of lines are low, the band utilization efficiency becomes low. For this reason, there is a problem that the communication system 10 is required to set a necessary band sufficient to ensure the communication quality of each line and avoid deterioration of the band utilization efficiency.

In order to solve the problem, the following prediction method may be performed.

In the prediction method, the band of each fluctuation element is predicted from observed traffic data, and the sum is set as the necessary band. Here, existing line fluctuation is predicted using a linear approximation function formula based on past traffic data. On the other hand, new line fluctuation is predicted using the same probability density function as that of the existing traffic.

Then, the band is designed at each time within the design period Tx, and a necessary band $Z(t_i)$ is calculated for each time $t_i$.

Patent Literature 1 discloses estimating a necessary band for each fluctuation element. An object of the present invention is to estimate a necessary band with higher accuracy than the method of Patent Literature 1. That is, in order to solve the above problems, an object of the present invention is to provide a band estimation device, a band estimation method, and a program capable of calculating a necessary band of a link of a communication system with high accuracy, ensuring the communication quality, and improving the band utilization efficiency.

Solution to Problem

In order to achieve the above object, a band estimation device according to the present invention estimates a probability density function of a traffic amount in a case of each line information from the line information by using a machine learning model in which a set of observed traffic data and the line information is learned, and sets an upper limit value of a confidence interval based on the estimated probability density function as a necessary band.

Specifically, a band estimation device according to the present invention is a band estimation device that calculates a necessary band of a link between communication devices in a communication system in which a plurality of lines is accommodated in the link, the band estimation device including a communication unit to which a contracted band for each line and a traffic amount of the link in an observation period up to the present, and a contracted band for each line in a future design period are input, and an arithmetic processing unit that creates a machine learning model for performing machine learning on the contracted band and the traffic amount for each time in the observation period and predicting a probability density function of the traffic amount from the contracted band, estimates the probability density function of the traffic amount for each time in the design period by applying the contracted band for each line in the design period to the machine learning model, and applies a desired confidence interval to the probability density function, and sets an upper limit value of the confidence interval as the necessary band.

Additionally, a band estimation method according to the present invention is a band estimation method for calculating a necessary band of a link between communication devices in a communication system in which a plurality of lines is accommodated in the link, the band estimation method including:

acquiring a contracted band for each line and a traffic amount of the link in an observation period up to the present;

creating a machine learning model for performing machine learning on the contracted band and the traffic amount for each time in the observation period and predicting a probability density function of the traffic amount from the contracted band;

acquiring the contracted band for each line in a future design period and estimating the probability density function of the traffic amount for each time in the design period by using the machine learning model; and applying a desired confidence interval to the probability density function, and setting an upper limit value of the confidence interval as the necessary band.

The present band estimation device and method create a model by performing machine learning on a past traffic amount and line information, and apply the line information to the model to estimate a probability density function of a future traffic amount. Then, the necessary band is set on the basis of the probability density distribution of the estimated traffic amount. That is, the present invention can provide a band estimation device, a band estimation method, and a program capable of calculating a necessary band of a link of a communication system with high accuracy by machine learning, ensuring the communication quality, and improving the band utilization efficiency.

Additionally, the present invention is a program for causing a computer to function as the band estimation device. The band estimation device of the present invention can also be implemented by a computer and a program, and the program can be recorded in a recording medium or provided through a network.

Note that the inventions described above can be combined as appropriate.

Advantageous Effects of Invention

The present invention can provide a band estimation device, a band estimation method, and a program capable of calculating a necessary band of a link of a communication system with high accuracy, ensuring the communication quality, and improving the band utilization efficiency.

BRIEF DESCRIPTION OF DRAWINGS

FIG. 3 is a table of time-series data of a vector x of line information and a scalar value y of a traffic amount.

FIG. 9 is a diagram for describing the band estimation device according to the present invention.

DESCRIPTION OF EMBODIMENTS

Embodiments of the present invention will be described with reference to the accompanying drawings. The embodiments described below are examples of the present invention, and the present invention is not limited to the following embodiments. Note that components having the same reference signs in the present description and the drawings indicate the same components.

Figure 1:
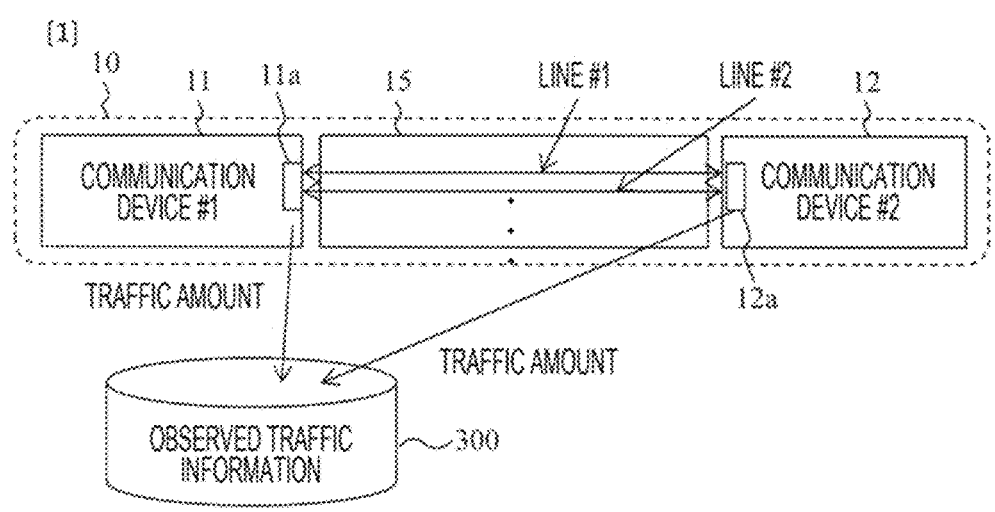
FIG. 1 is a diagram for describing a communication band calculation device related to the present invention.
Figure 2:
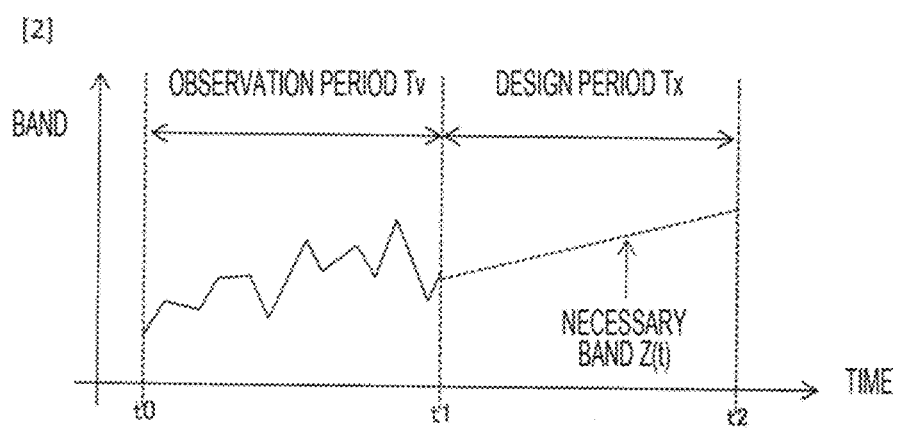
FIG. 2 is a diagram for describing an operation of the communication band calculation device related to the present invention.
Figure 4:
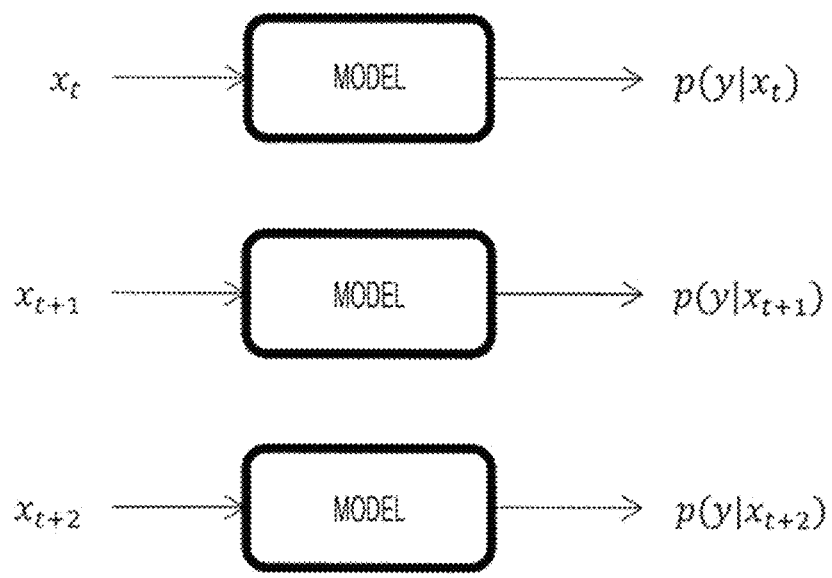
FIG. 4 is a diagram for describing a model used in a band estimation device according to the present invention.

FIG. 3 is a table of time-series data of a vector x of line information and a scalar value y of the traffic amount. FIG. 4 is a diagram for describing a model used in the present invention.

A vector $x_t$ at time t represents each row in part x of the table of FIG. 3, and in $$x_t = \{x_{(t,0)}, x_{(t,1)}, \ldots\},$$

each element $x_{(t,i)}$ represents the contracted band of a line i at time t.

A traffic amount $y_t$ at time t represents the traffic amount of all lines accommodated in the band design target link.

Figure 5:
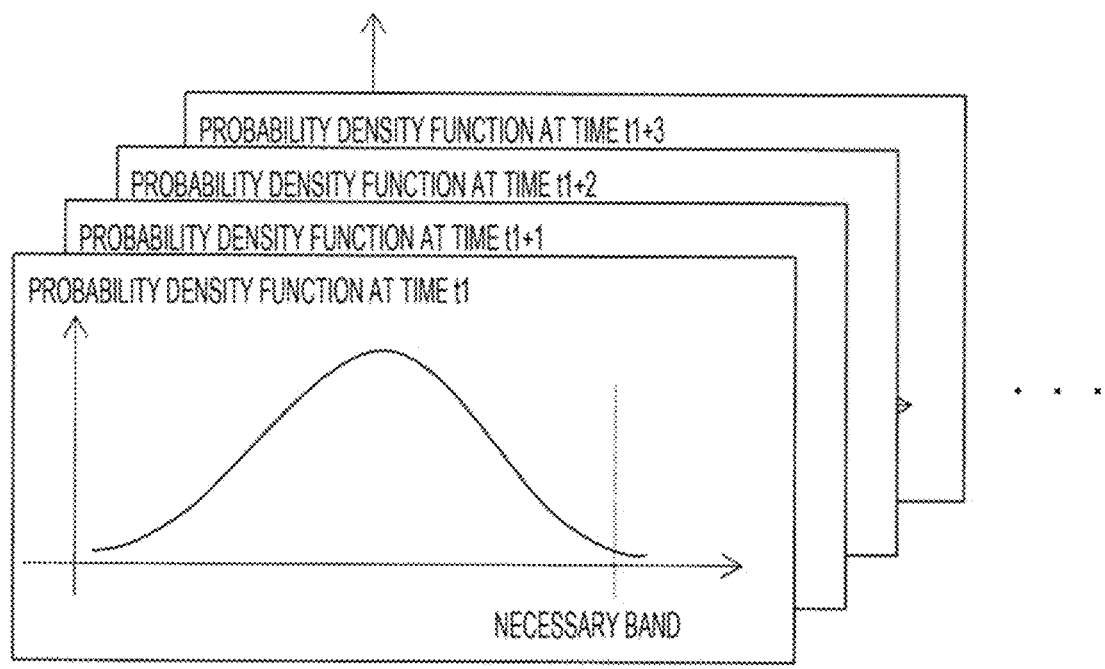
FIG. 5 is a diagram for describing a probability density function used in the band estimation device according to the present invention.

The vector $x_t$ of the observation period Tv and the design period Tx temporally changes along with new addition, contract change, or deletion of lines. The traffic amount $y_t$ in the observation period Tv is the traffic amount actually observed. As illustrated in FIG. 4, the present invention predicts a probability density function $p(y|x_t)$ using a "model" for each vector $x_t$ of the design period Tx. Note that the probability density function $p(y|x_t)$ represents the distribution of the traffic amount y when the line information is the vector $x_t$. As illustrated in FIG. 5, in the present invention, the probability density function $p(y|x_t)$ for each vector $x_t$ can be obtained by using a "model" for each vector $x_t$.

Figure 6:
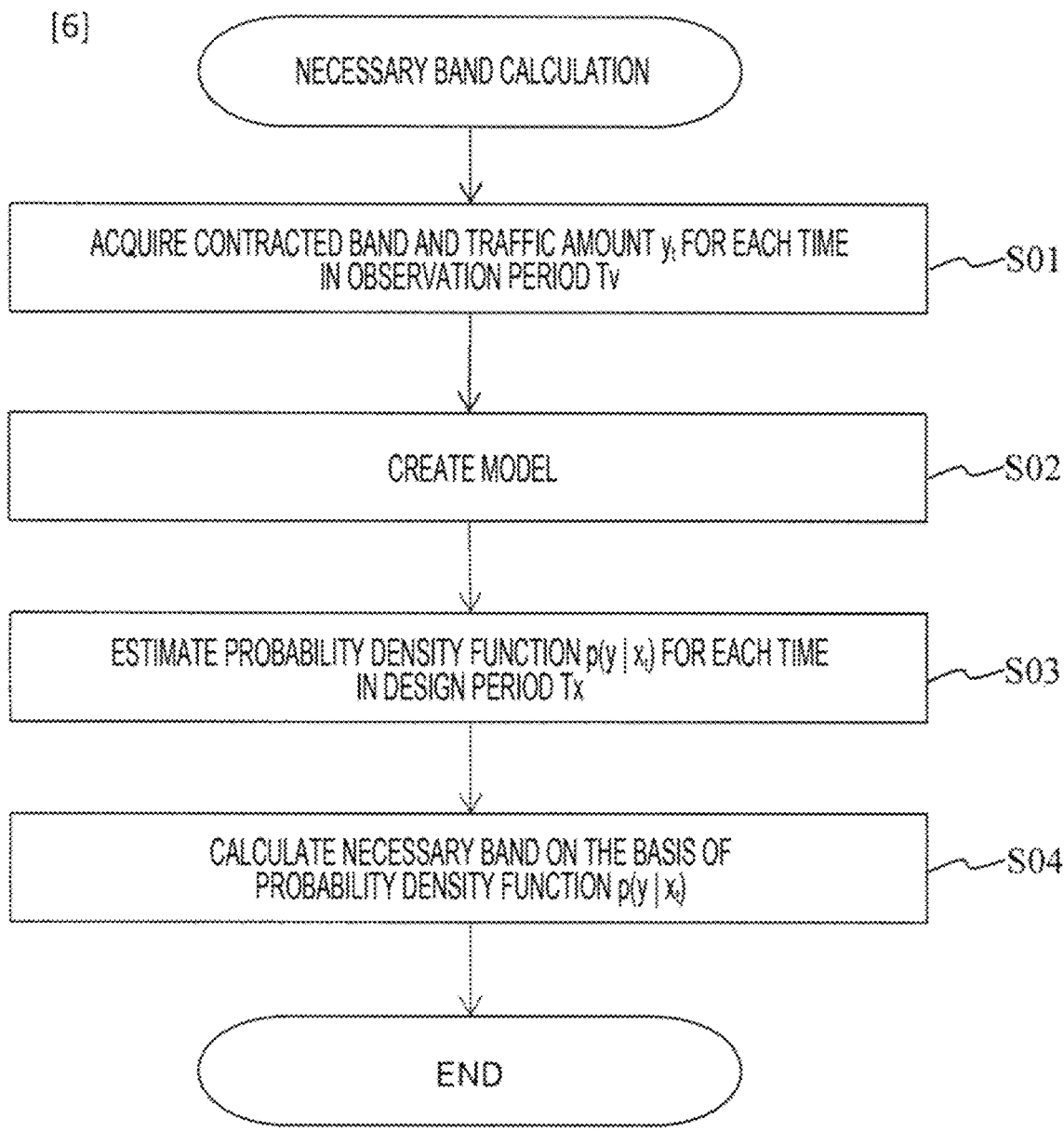
FIG. 6 is a flowchart for describing a band estimation method according to the present invention.

FIG. 6 is a flowchart for describing a band estimation method according to the present invention. The present band estimation method is a band estimation method for calculating a necessary band of the link 15 between communication devices (11, 12) in a communication system 10 in which a plurality of lines i is accommodated in the link 15, the band estimation method including:

acquiring a contracted band $x_{(t,i)}$ for each line i and a traffic amount $y_t$ of the link 15 in the observation period Tv up to the present (step S01);

creating a machine learning model (model) for performing machine learning on the contracted band $x_{(t,i)}$ and the traffic amount $y_t$ for each time in the observation period Tv and predicting the probability density function $p(y|x_t)$ of the traffic amount from the contracted band $x_{(t,i)}$ (step S02);

acquiring the contracted band $x_{(t,i)}$ for each line i in the future design period Tx and estimating the probability density function $p(y|x_t)$ of the traffic amount for each time in the design period Tx by using the machine learning model (step S03); and applying a desired confidence interval to the probability density function $p(y|x_t)$, and setting an upper limit value of the confidence interval as the necessary band (step S04).

Figure 7:
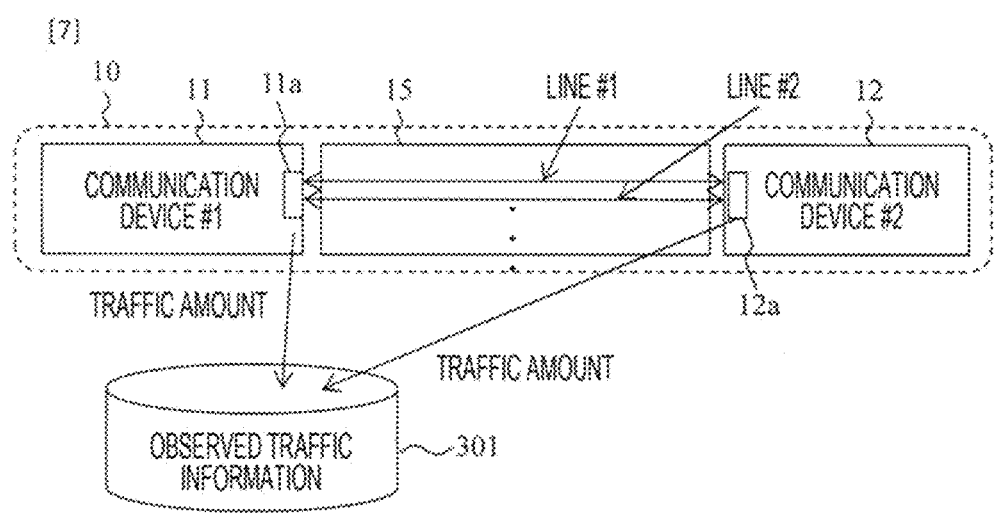
FIG. 7 is a diagram for describing the band estimation device according to the present invention.

FIG. 7 is a diagram for describing a band estimation device 301 and the communication system 10 as a measurement target according to the present invention. The communication system 10 is a network in which the plurality of lines i is accommodated in the link 15 between any two communication devices (11, 12). The steps of FIG. 6 will be described in detail with reference to FIG. 7.

[Step S01]

The band estimation device 301 acquires time-series data in the observation period Tv for the contracted band of each line i and the traffic average counter value in an arbitrary time unit for each communication device (11, 12).

[Step S02]

The band estimation device 301 performs machine learning on the acquired data of the observation period Tv and creates a model for predicting the probability density function $p(y|x_t)$ of the traffic amount from the vector $x_t$. That is, the model is a model for obtaining the probability density function $p(y|x_t)$ of the traffic amount between the communication devices (11, 12) at a certain time t from the vector $x_t$ at the time t. Deep learning is used to create the model for obtaining the probability density function $p(y|x)$ of the traffic amount in the case of x from the vector x in this step.

For example, a latent variable model may be assumed as the model created in this step to give a generalization ability to the model. Formula (A) using the latent variable model will be described with reference to FIG. 9. Note that in Formula (A), the vector $x_t$ is abbreviated as x. In Formula (A), q represents a probability density function of an encoder that converts the vector $x_t$ as an observation variable into a latent variable z, and $\varphi$ represents a parameter of the encoder. Additionally, $\theta$ in the eighth row of Formula (A) represents a parameter of a decoder that converts the latent variable z into the vector $x_t$ as an observation variable, and $p_\theta$ represents a probability density function of the decoder. In FIG. 9, $Ez \sim q_\varphi(z|x)$ of the first item on the right side of the eighth row indicates expected values in a distribution $q_\varphi(z|x)$ with z as a variable.

Since it is difficult to directly obtain the probability density function $p(y|x)$, formula deformation is performed as illustrated in FIG. 9, and the probability density function $p(y|x)$ is replaced with a variational lower limit that is a calculable amount (eighth row in FIG. 9). In FIG. 9, the second to third rows, the third to fourth rows, and the fifth to sixth rows perform formula deformation using the definition of conditional probability. Here, conditional probability is, for example, a probability that an event Y will occur under the condition that an event X occurs, expressed by Expression 1.

[Expression 1]

$$p\{Y|X\} = \frac{p(X|Y)}{p(X)} \quad (1)$$

Additionally, in FIG. 9, the fourth to fifth rows and the sixth to seventh rows perform formula deformation using the definition of KL divergence. KL divergence is, for example, when there are two probability density functions $p(x)$ and $q(x)$, an index indicating how similar the probability density functions $p(x)$ and $q(x)$ are, and is expressed by Expression 2.

[Expression 2]

$$D_{KL}(p\|q) = \int p(x) \log \frac{p(x)}{q(x)} dx \quad (2)$$

The right side of the eighth row obtained from the formula deformation illustrated in FIG. 9 is referred to as a variational lower limit, and $\theta$ and $\varphi$ ID that maximize the variational lower limit are calculated to obtain the probability density function $p(y|x)$.

[Step S03]

The band estimation device 301 acquires time-series data of the design period Tx for the contracted band of each line i.

The band estimation device 301 estimates the probability density function $p(y|x_t)$ of the traffic amount at each time t in the design period Tx using a model for each vector $x_t$ in the design period Tx.

[Step S04]

The band estimation device 301 obtains the upper limit value of the confidence interval necessary for ensuring the communication quality from the probability density function $p(y|x_t)$ for each time t of the design period Tx. Specifically, the band estimation device 301 obtains the mean and the standard deviation from the probability density function $p(y|x_t)$ for the vector $x_t$ of each time t, and obtains the upper limit value of the confidence interval of $\beta$ %. Then, the band estimation device 301 sets the upper limit value of the confidence interval as the necessary band at each time t. For example, in a case where a Gaussian distribution is assumed for the probability density function $p(y|x_t)$, an upper limit of $5\sigma$ from the mean may be used. Here, $\sigma$ represents the standard deviation of $p(y|x_t)$.

Figure 8:
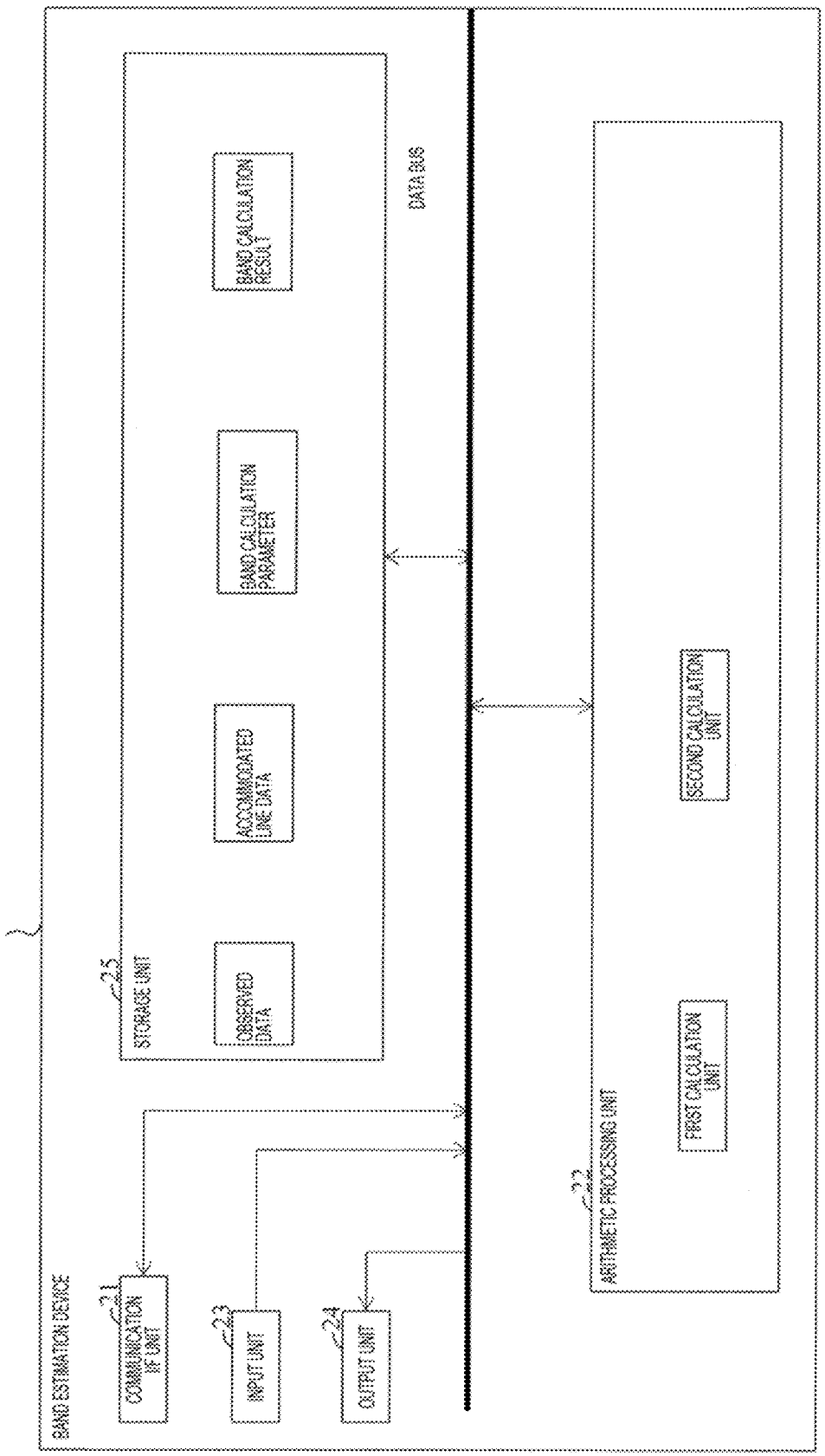
FIG. 8 is a diagram for describing the band estimation device according to the present invention.

FIG. 8 is a diagram for describing the band estimation device 301. The band estimation device 301 is a band estimation device that calculates a necessary band of the link 15 between the communication devices (11, 12) in the communication system 10 in which a plurality of lines i is accommodated in the link 15, the band estimation device including a communication unit 21 to which the contracted band $x_{(t,i)}$ for each line i and the traffic amount $y_t$ of the link 15 in the observation period Tv up to the present, and the contracted band $x_{(t,i)}$ for each line i in the future design period Tx are input, and an arithmetic processing unit 22 that creates a machine learning model (model) for performing machine learning on the contracted band $x_{(t,i)}$ and the traffic amount $y_t$ for each time in the observation period Tv and predicting the probability density function $p(y|x_t)$ of the traffic amount from the contracted band $x_{(t,i)}$, estimates the probability density function $p(y|x_t)$ of the traffic amount for each time in the design period Tx by applying the contracted band $x_{(t,i)}$ for each line i in the design period Tx to the machine learning model, and applies a desired confidence interval to the probability density function $p(y|x_t)$, and sets an upper limit value of the confidence interval as the necessary band.

The communication unit 21 has a function of performing data communication with an external device via a communication line. The contracted band $x_{(t,i)}$ and the traffic amount $y_t$ acquired at the physical port (11a, 12a) of each communication device (11, 12) are input to the communication unit 21 in steps S01 and S03 described above.

The arithmetic processing unit 22 includes a first calculation unit and a second calculation unit.

The first calculation unit creates a model from the traffic amount $y_t$ and the line information (vector $x_t$), and estimates the probability density function $p(y|x_t)$ at each time using the model. The first calculation unit is associated with steps S01 to S03 described above.

The second calculation unit calculates the upper limit value of the $\beta$ % confidence interval of the estimated probability density function $p(y|x_t)$ as the necessary band. The second calculation unit is associated with step S04 described above.

The band estimation device 301 further includes a data bus 20, an input unit 23, an output unit 24, and a storage unit 25.

The storage unit 25 stores observed data (time series data y of past traffic amount $y_t$), accommodated line data (data such as contracted band $x_{(t,i)}$ of each line i), a band calculation parameter (parameter used for model 1 for estimating traffic amount y't), and a band calculation result (necessary band).

Parameters and programs are input to the input unit 23 from an operator, a network controller, or the like.

The output unit 24 has a function of outputting a file or displaying a calculation state or a calculation result on a screen.

The data bus 20 has a function of connecting units for transmission and reception of data of the units.
(Effect)

In order to describe the effect of the band estimation device 301, time-series data of the traffic amount in the design period Tx is also acquired.

Figure 10:
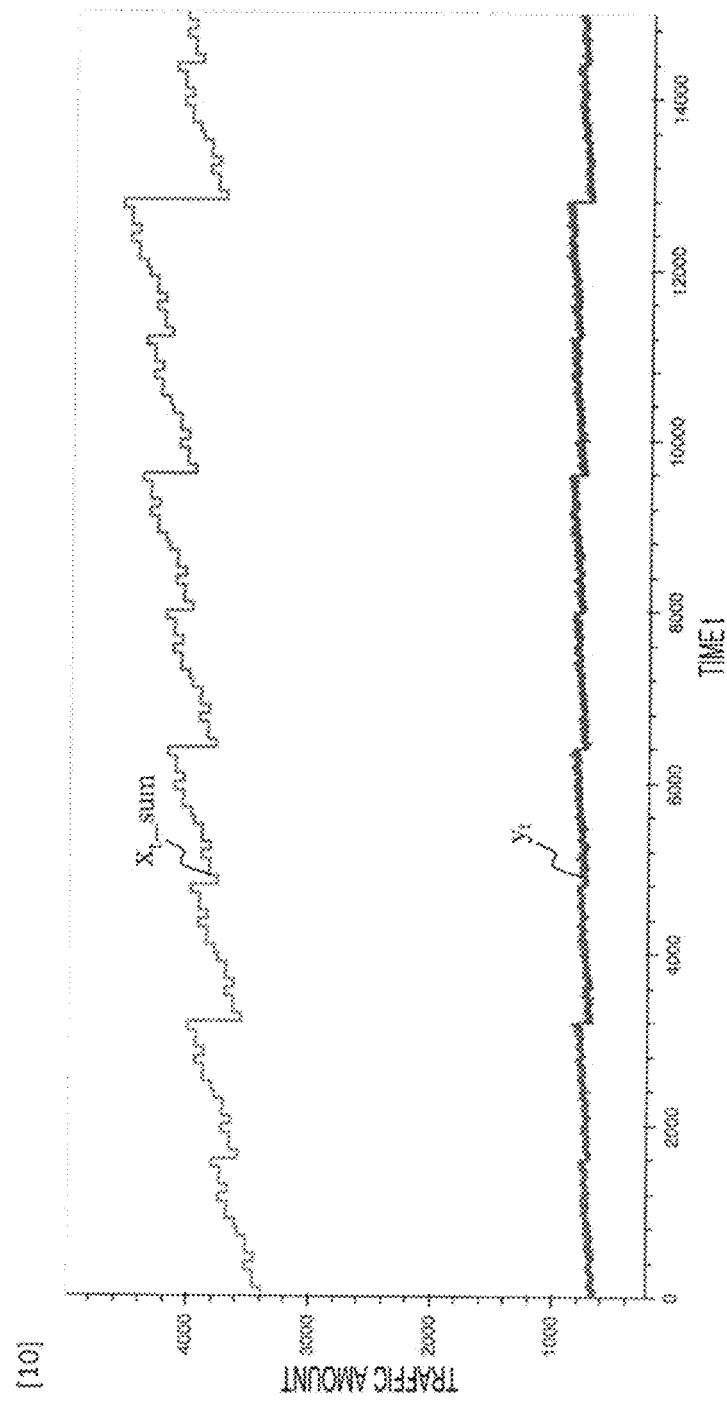
FIG. 10 is a diagram for describing an effect of the band estimation device according to the present invention.
Figure 11:
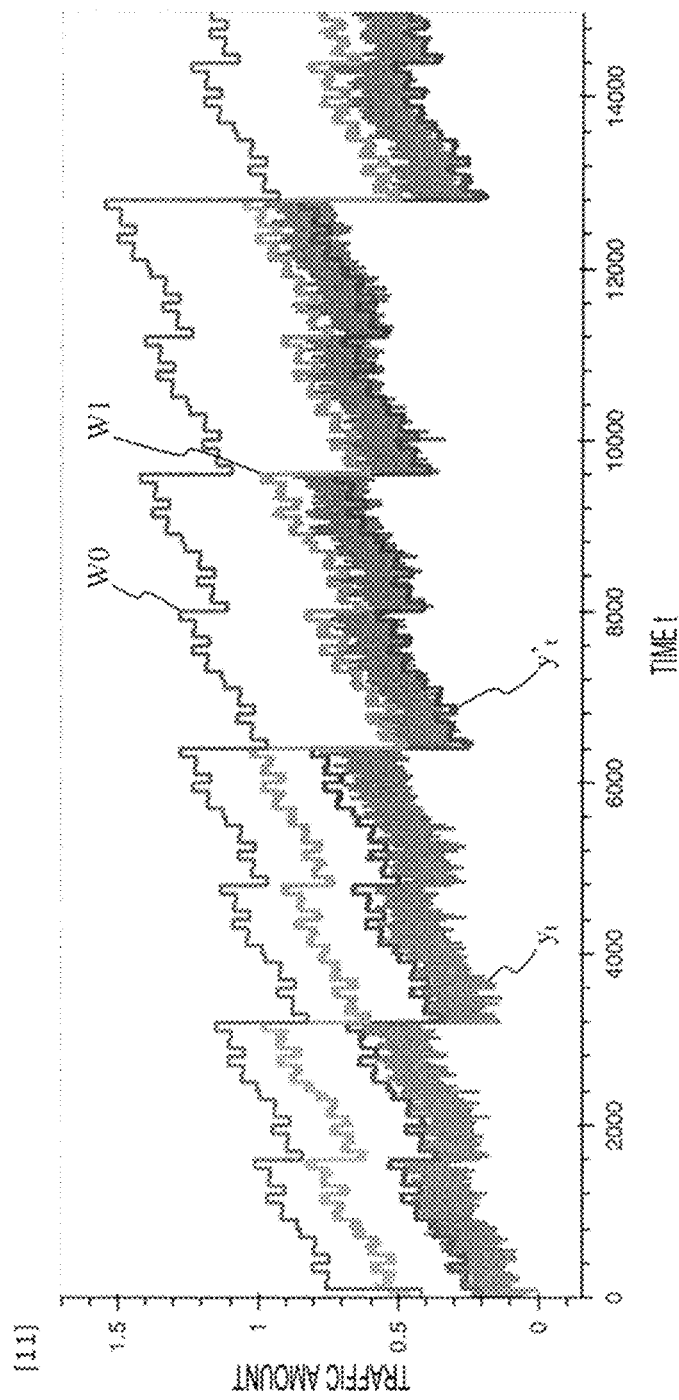
FIG. 11 is a diagram for describing the effect of the band estimation device according to the present invention.

FIGS. 10 and 11 are diagrams for describing the effect of the band estimation device 301. FIG. 10 illustrates a total sum $x_t$_sum regarding the line i of the contracted band $x_{(t,i)}$ and the actual traffic amount $y_t$ in the design period Tx. FIG. 11 illustrates the actual traffic amount $y_t$, an average traffic amount y't obtained from the probability density function $p(y|x_t)$ estimated by the band estimation device 301, a necessary band W1 calculated by the band estimation device 301, and a necessary band W0 calculated by the communication band calculation device 300 in the design period Tx. Note that the actual traffic amount $y_t$ in FIG. 10 is a measured value, and the actual traffic amount $y_t$ in FIG. 11 is obtained by performing min-max normalization on the measured value. These are the same traffic amount $y_t$ displayed differently.

Referring to FIG. 10, it can be seen that the actual traffic amount $y_t$ changes with time according to the total sum $x_t$_sum of the contracted bands $x_{(t,i)}$.

In FIG. 11, since the necessary band W1 calculated by the band estimation device 301 exceeds the actual traffic amount $y_t$ at all times, packets are not discarded and the communication quality can be maintained.

Furthermore, since the necessary band W1 calculated by the band estimation device 301 is lower than the necessary band W0 calculated by the communication band calculation device 300, the band utilization efficiency can be improved.

Additionally, if parameters of the model are adjusted according to the traffic pattern of the traffic observed in the observation period Tv, a model according to the feature of the traffic can be created. For example, in a case where traffic greatly fluctuates depending on the day of the week or the season, it is conceivable to adjust the parameter according to the traffic pattern.

As described above, the band estimation device 301 of the present invention can estimate the probability density function $p(y|x_t)$ of each time on the basis of the line information $x_{(t,i)}$ of each time in the design period Tx by creating a model for estimating the probability density function $p(y|x_t)$ of the traffic amount from the line information using the traffic amount $y_t$ and the line information $x_{(t,i)}$ in the observation period Tv. Then, the necessary band for ensuring the communication quality can be calculated on the basis of the probability density function.

Therefore, since the band estimation device 301 of the present invention can estimate the probability density function of the traffic amount at each time, it is possible to reduce the necessary band for ensuring the communication quality to the minimum, and improve the band utilization efficiency.

Other Embodiments

The band estimation device 301 can also be implemented by a computer and a program, and the program can be recorded in a recording medium or provided through a network.

Figure 12:
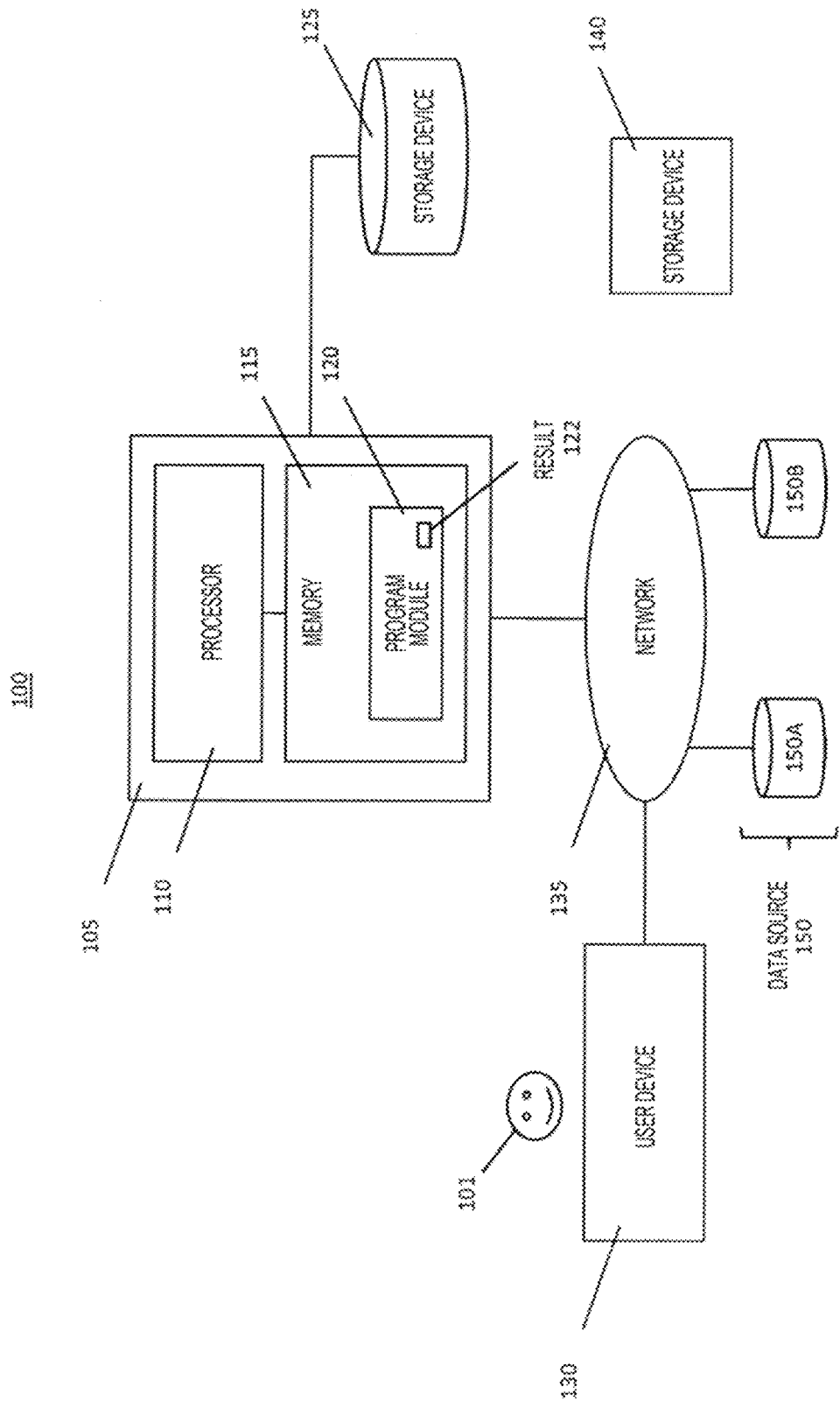
FIG. 12 is a diagram for describing the band estimation device according to the present invention.

FIG. 12 illustrates a block diagram of a system 100. The system 100 includes a computer 105 connected to a network 135.

The network 135 is a data communication network. The network 135 may be a private network or a public network, and may include any or all of (a) a personal area network, for example, covering a room, (b) a local area network, for example, covering a building, (c) a campus area network, for example, covering a campus, (d) a metropolitan area network, for example, covering a city, (e) a wide area network, for example, covering an area connected across boundaries of cities, rural areas, or the countries, or (f) the Internet. Communication is performed by an electronic signal and an optical signal via the network 135.

The computer 105 includes a processor 110 and a memory 115 connected to the processor 110. The computer 105 is represented herein as a standalone device, but is not limited in this way, and rather may be connected to other devices (not shown) in a distributed processing system.

The processor 110 is an electronic device including logic circuitry that responds to and executes instructions.

The memory 115 is a tangible computer readable storage medium in which a computer program is encoded. In this regard, the memory 115 stores data and instructions, i.e., program codes, that are readable and executable by the processor 110 to control the operation of the processor 110. The memory 115 may be implemented by a random access memory (RAM), a hard drive, a read-only memory (ROM), or a combination thereof. One of the components of the memory 115 is a program module 120.

The program module 120 includes instructions for controlling the processor 110 to perform processes described herein. In the present specification, operations are described as being performed by the computer 105 or a method or a process or a sub-process thereof. The operations are actually executed by the processor 110.

The term "module" is used herein to refer to a functional operation that may be embodied either as a stand-alone component or as an integrated configuration of a plurality of sub-components. Therefore, the program module 120 can be implemented as a single module or as a plurality of modules that operates in cooperation with each other. Furthermore, although the program module 120 is described herein as being installed in the memory 115 and thus implemented in software, the program module can be implemented in any of hardware (for example, an electronic circuit), firmware, software, or a combination thereof.

Although shown as already loaded into the memory 115, the program module 120 may be configured to be located on a storage device 140 so as to be subsequently loaded into the memory 115. The storage device 140 is a tangible computer readable storage medium that stores the program module 120. Examples of the storage device 140 include a compact disk, a magnetic tape, a read-only memory, an optical storage media, a hard drive or a memory unit including a plurality of parallel hard drives, and a universal serial bus (USB) flash drive. Alternatively, the storage device 140 may be a random access memory or another type of electronic storage device located in a remote storage system (not shown) and connected to the computer 105 via the network 135.

The system 100 described herein further includes a data source 150A and a data source 150B collectively referred to as a data source 150, and communicatively connected to the network 135. In practice, the data source 150 may include any number of data sources, i.e., one or more data sources. The data source 150 includes unstructured data and may include social media.

The system 100 further includes a user device 130 operated by a user 101 and connected to the computer 105 via the network 135. The user device 130 includes an input device, such as a keyboard or voice recognition subsystem, for enabling the user 101 to communicate information and command selections to the processor 110. The user device 130 further includes an output device such as a display device, a printer, or a speech synthesizer. A cursor control unit, such as a mouse, a trackball, or a touch-sensitive screen, allows the user 101 to manipulate a cursor on the display device to communicate further information and command selections to the processor 110.

The processor 110 outputs a result 122 of execution of the program module 120 to the user device 130. Alternatively, the processor 110 may provide the output to a storage device 125 such as a database or a memory, or to a remote device not shown, via the network 135.

For example, a program that performs the flowchart of FIG. 6 may be used as the program module 120. The system 100 can be operated as the band estimation device 301.
(Supplement)

The term "comprise . . . " or "comprising . . . " specify that the feature, integer, step, or component mentioned is present, but should be construed as not excluding that one or more other features, integers, steps, or components, or groups thereof are present. The terms "a" and "an" are indefinite articles for an object and therefore do not exclude embodiments having a plurality of objects.

Note that the present invention is not limited to the above embodiments, and various modifications can be made without departing from the gist of the present invention. In short, the present invention is not limited to the high-order embodiment as it is, and in the implementation stage, the components can be modified and embodied without departing from the gist thereof.

Additionally, various inventions can be made by appropriately combining a plurality of components disclosed in the above embodiments. For example, some components may be deleted from all the components shown in the embodiments. Furthermore, components in different embodiments may be appropriately combined.

REFERENCE SIGNS LIST

10 Communication system
11, 12 Communication device
11a, 12a Physical port
15 Link
20 Data Bus
21 Communication unit
22 Arithmetic processing unit
23 Input unit
24 Output unit
25 Storage unit
100 System
101 User
105 Computer
110 Processor
115 Memory
120 Program module
122 Result
125 Storage device
130 User device
135 Network
140 Storage device
150 Data source
300 Communication band calculation device
301 Band estimation device

The invention claimed is:

1. A band estimation device that calculates a necessary band of a link between communication devices in a communication system in which a plurality of lines is accommodated in the link, the necessary band improves band utilization efficiency, the band estimation device comprising
a communication unit to which a contracted band for each line, a traffic amount of the link in an observation period, and a contracted band for each line in a future design period are input, and
an arithmetic processing unit that
creates a machine learning model for performing machine learning on the contracted band and the traffic amount for each time in the observation period and predicting a probability density function of the traffic amount from the contracted band,
estimates the probability density function of a future traffic amount for each time in the design period by applying the contracted band for each line in the design period to the machine learning model,
applies a desired confidence interval to the probability density function for the future traffic amount, where a lower limit of the desired confidence interval indicates a lowest likely amount of future traffic and an upper limit of the desired confidence interval indicates a highest likely amount of future traffic, and
sets the upper limit of the desired confidence interval as the necessary band of the link between communication devices in the communication system.

2. A band estimation method for calculating a necessary band of a link between communication devices in a communication system in which a plurality of lines is accommodated in the link, the band estimation method comprising:
acquiring a contracted band for each line and a traffic amount of the link in an observation period;
creating a machine learning model for performing machine learning on the contracted band and the traffic amount for each time in the observation period and predicting a probability density function of the traffic amount from the contracted band;
acquiring the contracted band for each line in a future design period and estimating the probability density function of a future traffic amount for each time in the design period by using the machine learning model; and
applying a desired confidence interval to the probability density for the future traffic amount, where a lower limit of the desired confidence interval indicates a lowest likely amount of future traffic and an upper limit of the desired confidence interval indicates a highest likely amount of future traffic, and
setting the upper limit of the desired confidence interval as the necessary band of the link between communication devices in the communication system.

3. A non-transitory computer-readable medium having computer-executable instructions that, upon execution of the instructions by a processor of a computer, cause the computer to function as the band estimation device according to claim 1.

4. The band estimation device of claim 1, wherein the machine learning model is a latent variable model.

5. The band estimation method of claim 2, wherein the machine learning model is a latent variable model.

6. A band estimation method for calculating a necessary band of a link between communication devices in a communication system in which a plurality of lines is accommodated in the link, the band estimation method comprising:
acquiring a contracted band for each line and a traffic amount of the link in an observation period;
creating a latent variable model and performing machine learning on the contracted band and the traffic amount for each time in the observation period and predicting a probability density function of the traffic amount from the contracted band,
estimates the probability density function of a future traffic amount for each time in the design period by applying the contracted band for each line in the design period to the machine learning model, and
sets a desired confidence interval comprising a lower limit value and an upper limit value to the probability density function of the future traffic amount, where the lower limit value is the lowest future traffic amount within the desired confidence interval on the probability density function and the upper limit value is the highest future traffic amount within the desired confidence interval on the probability density function, and
sets the upper limit value of the desired confidence interval as the necessary band of the link between communication devices in the communication system.

* * * * *